April 24, 1934.    J. W. ARMOUR    1,955,999
GAS SCRUBBER
Filed June 13, 1932

INVENTOR
JAMES W. ARMOUR
BY
Albert G. Blodgett
ATTORNEY

Patented Apr. 24, 1934

1,955,999

UNITED STATES PATENT OFFICE 1,955,999

GAS SCRUBBER

James W. Armour, Worcester, Mass., assignor to Riley Stoker Corporation, Worcester, Mass., a corporation of Massachusetts Application June 13, 1932, Serial No. 616,876

3 Claims. (Cl. 183—21)

This invention relates to gas scrubbers, and more particularly to gas scrubbers having an upper tank from which water is delivered through restricted openings to deflecting surfaces in the path of the gases.

In certain cases, a gas scrubber of this type must be used for cleaning gas which is under suction, that is, at a pressure below that of the atmosphere. For example, gas scrubbers are frequently used for removing the fine ash particles from waste furnace gases, these gases being drawn from the furnace and through the scrubber by means of an induced draft fan. The low pressure of the gases tends to increase the flow of water through the restricted openings, and makes it necessary to use very small openings to prevent excessive flow. Such small openings are undesirable, since they become obstructed too easily by any foreign matter carried in suspension in the water. Moreover, the gas pressure frequently changes during operation, causing a variation in the flow of water through the scrubber, and this is liable to occur even in scrubbers in which the gas is at a pressure above that of the atmosphere.

It is accordingly one object of the present invention to provide a gas scrubber which may be used for cleaning gas at a pressure below atmospheric, and which is so arranged that no unusually small openings need be utilized for controlling the water flow.

It is a further object of the invention to provide a gas scrubber in which the rate of water flow will be unaffected by changes in the pressure of the gas.

With these and other objects in view, as will be apparent to those skilled in the art, the invention resides in the combination of parts set forth in the specification and covered by the claims appended hereto.

Referring to the drawing illustrating one embodiment of the invention, and in which like reference numerals indicate like parts, Fig. 1 is a somewhat diagrammatic elevation on a small scale showing a gas scrubber connected to a furnace and arranged to clean the waste furnace gases;

Figure 3:
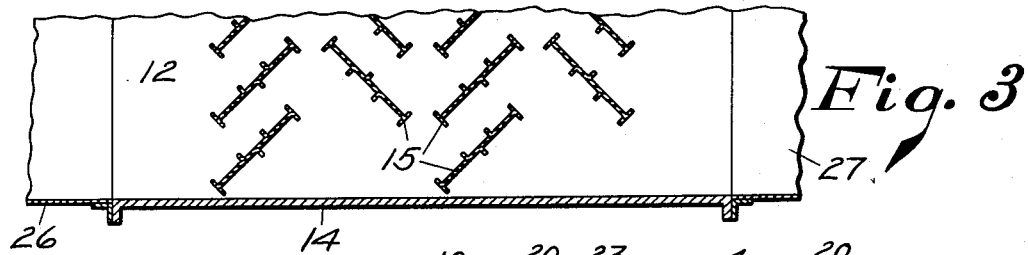
Fig. 3 is a partial section on the line 3—3 of Fig. 2.
Figures 4, 5:
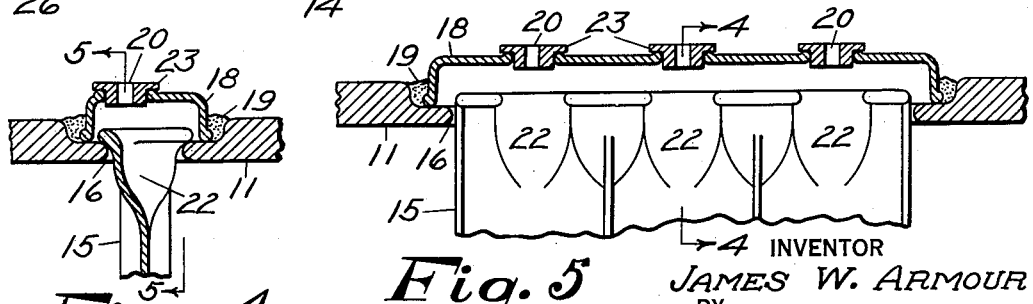
Fig. 4 is an enlarged view in section showing the means for distributing water to the deflector plates, the section being taken on the line 4—4 of Fig. 5.
Fig. 5 is a section on the line 5—5 of Fig. 4.

In the drawing I have shown a gas scrubber of the general type disclosed in the application of Fred H. Daniels et al., Serial No. 608,716, filed May 2, 1932. The illustrated embodiment comprises an upper tank 10 having a flat bottom wall 11 which forms the upper wall of a horizontal gas passage 12. Vertical plates 14 form the side walls of this passage. A number of ribbed plates 15 are mounted in the passage 12 to form deflecting surfaces in the path of the gases. These plates are preferably suspended at their upper edges from the wall 11, and arranged at an angle to the general direction of the gas flow, as shown in Fig. 3.

The upper tank 10 contains a suitable liquid, such as water, which is allowed to flow downwardly over the deflecting plates 15. In order to control this flow and distribute the water properly, the upper edge of each plate 15 is located in a rectangular opening or slot 16 in the bottom wall 11 of the tank, and a cover plate 18 is mounted over each slot and sealed in place by means of cement 19. Each cover plate is provided with several restricted openings or orifices 20, each of which is arranged to discharge a jet of water into a pocket or recess 22 in the deflecting plate. The water, as it leaves the pockets, spreads out laterally over the surface of the plate in a thin downwardly flowing film. The orifices 20 are preferably formed in separate flanged sleeves or nozzles 23 secured in the cover plates.

Figure 1:
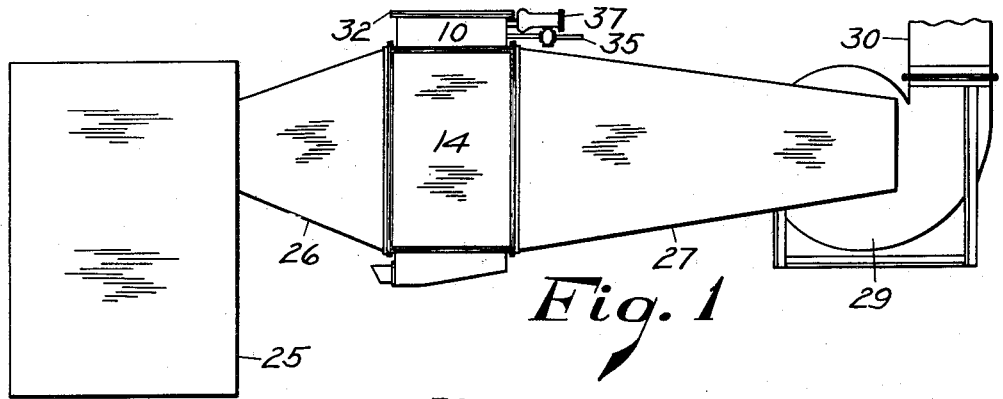
Figure 2:
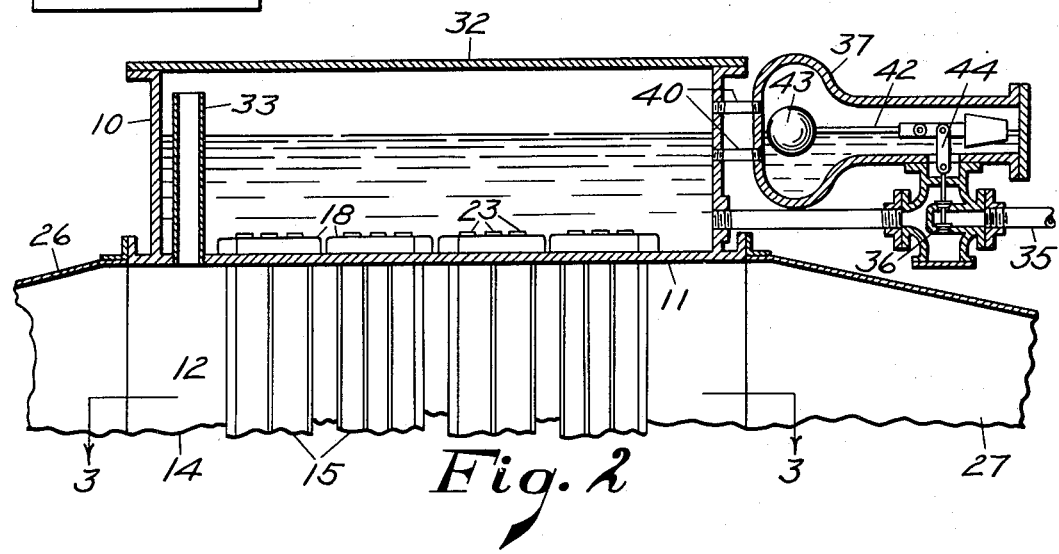
Fig. 2 is a longitudinal section through the upper part of the gas scrubber.

As shown in Fig. 1, the waste gases from a furnace 25 flow through a duct 26 to the gas passage 12 of the scrubber, and thence through a duct 27 to an induced draft fan 29. The fan discharges into a duct 30 leading to a stack (not shown). It will be apparent that the fan 29 will cause a substantial reduction in the gas pressure within the passage 12, and if the scrubber is constructed as shown in the above mentioned application of Daniels et al., the reduced pressure will tend to increase the flow of water considerably. Consequently, very small orifices are necessary to limit the flow, and these orifices may become obstructed rather easily by any foreign matter carried by the water.

In order to overcome this difficulty, I provide a construction so arranged that the pressure over the surface of the water above the orifices 20 is equal to the pressure in the gas passage 12. The flow of water thus depends solely upon the height of the water above the orifices, and the orifices can be made the same size whether the gas is above or below atmospheric pressure.

One suitable construction is illustrated in the drawing, in which I have shown a cover plate 32 which serves to close the tank 10, and a pipe or conduit 33 which forms a communicating passage between the interior of the tank and the gas passage 12. The pipe 33 is preferably mounted in a vertical position with its upper end above the water level in the tank and its lower end screw-threaded into an opening in the bottom wall 11 of the tank. Water is supplied to the tank from any suitable source through a pipe 35 provided with a valve 36, and this valve is preferably controlled automatically to maintain a constant water level in the tank. For this purpose I have shown an auxiliary closed tank 37 connected to the tank 39 both above and below the water level by means of pipes 40. A horizontal lever 42 having a float 43 at one end is pivotally mounted within the auxiliary tank 37 and connected to the valve 36 by means of a link 44.

The operation of the invention will now be apparent from the above disclosure. The fan 29 draws the gases from the furnace 25 through the duct 26, passage 12 and duct 27, and discharges the gases through the duct 30. Dust in the gases is collected on the deflecting plates 15 and washed downwardly by the water supplied to the plates through the orifices 20. The water in the tank 10 and the auxiliary tank 37 is at the same level, and this level is kept constant by the float actuated valve 36, which admits additional water at the required rate through the pipe 35.

Since the tank 10 is closed, and since the space above the water therein is in communication with the gas passage 12 through the pipe 33, the effective head on the orifices 20 is not increased by the reduction in gas pressure caused by the fan 29. Hence the orifices can be made comparatively large, with a resulting reduction in the danger of plugging. Furthermore it is not necessary to provide an extremely low water head in the tank 10 to avoid excessive rates of flow. Such a low head is undesirable, since any warping of the structure would cause the water to be deeper over some of the orifices than over others, and great care would be required to maintain the tank exactly level. With the construction illustrated a substantial head can be provided, and any slight warping will have practically no effect on the water flow. It will also be apparent that changes in the gas pressure during operation will not vary the rate of water flow.

Having thus described my invention, what I claim as new and desire to secure by Letters Patent is:

1. A gas scrubber comprising walls forming a gas passage, means providing deflecting surfaces for gas flowing through the passage, a tank above the gas passage, means to provide a constant level of liquid in the tank, and means to equalize the pressure above the liquid and the pressure of the gas, the tank having restricted openings through which liquid may flow from the tank to the deflecting surfaces under the influence of gravity.

2. A gas scrubber comprising a tank provided with a flat horizontal bottom wall having openings therein and forming the upper wall of a gas passage, deflector plates beneath the openings, cover plates mounted over the openings and forming a leak proof joint with the bottom wall, said cover plates having orifices therein to distribute liquid from the tank to the deflector plates, means to supply liquid to the tank, a cover plate closing the top of the tank, and a conduit connecting the gas passage with the interior of the tank above the surface of the liquid therein.

3. A gas scrubber comprising walls forming a gas passage, means providing deflecting surfaces for gas flowing through the passage, a tank above the gas passage, a cover plate closing the top of the tank, means to provide a constant level of liquid in the tank, and a conduit connecting the gas passage with the interior of the tank above the surface of the liquid therein, the tank having restricted openings through which liquid may flow from the tank to the deflecting surfaces under the influence of gravity.

JAMES W. ARMOUR.